United States Patent
Aher et al.

(10) Patent No.: US 11,095,853 B1
(45) Date of Patent: Aug. 17, 2021

(54) SYSTEM AND METHODS TO DETERMINE READINESS IN VIDEO COLLABORATION

(71) Applicant: Rovi Guides, Inc., San Jose, CA (US)

(72) Inventors: Ankur Anil Aher, Maharashtra (IN); Charishma Chundi, Andhra Pradesh (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/102,653

(22) Filed: Nov. 24, 2020

(51) Int. Cl.
  *H04N 7/15* (2006.01)
  *G10L 25/51* (2013.01)
  *G06K 9/00* (2006.01)

(52) U.S. Cl.
  CPC .......... *H04N 7/15* (2013.01); *G06K 9/00711* (2013.01); *G10L 25/51* (2013.01)

(58) Field of Classification Search
  CPC . H04N 7/15; H04N 7/14; H04L 25/51; H04L 41/5067; H04L 43/045; G06K 9/00
  USPC ............ 348/14.01–14.16; 715/753; 709/204
  See application file for complete search history.

(56) References Cited

U.S. PATENT DOCUMENTS

| | | | |
|---|---|---|---|
| 2015/0195492 A1* | 7/2015 | Leerentveld | H04M 3/567 348/14.03 |
| 2016/0073058 A1* | 3/2016 | Bader-Natal | G06F 3/0482 348/14.03 |
| 2019/0189117 A1* | 6/2019 | Kumar | H04L 51/02 |

\* cited by examiner

*Primary Examiner* — Melur Ramakrishnaiah
(74) *Attorney, Agent, or Firm* — Haley Guiliano LLP

(57) ABSTRACT

A system or method of prioritizing participants in a virtual meeting via a network by scoring each participant on several criteria and weighting the criteria to determine a readiness score. The system of accesses, for each of a plurality of participants, network data, video data, audio data, processing data, and participation data. The system determines, for each of the plurality of participants, a signal strength score based on the corresponding network data, a background score based on the corresponding video data and audio data, a microphone proximity score based on the corresponding video data, a processing score for each of the plurality of participants based on the corresponding processing data, and an engagement score based on the corresponding video data and participation data. The system calculates the readiness score, for each participant, based at least on the corresponding signal strength score, background score, engagement score, and processing score, ranks the participants, and provides the ranked participants.

20 Claims, 10 Drawing Sheets

| | WEIGHTS | 0.25 _191_ | 0.15 _193_ | 0.15 _195_ | 0.20 _197_ | 0.25 _199_ | | |
|---|---|---|---|---|---|---|---|---|
| | | SIGNAL STRENGTH 181 | BACKGROUND 183 | ENGAGEMENT 185 | MICROPHONE PROXIMITY 187 | PROCESSOR 189 | READINESS SCORE 190 | RANK 192 |
| ALLIE 130 | | 8.4 | 7.5 | 2.9 | 4.4 | 7.3 | 6.37 | 5 _132_ |
| BOB 120 | | 6.9 | 6.3 | 4.1 | 6.6 | 7.7 | 6.53 | 4 _122_ |
| CARL 150 | | 9.2 | 7.4 | 5.1 | 6.8 | 8.2 | 7.59 | 2 _152_ |
| DEE 170 | | 8.1 | 7.6 | 9.0 | 8.3 | 7.6 | 8.08 | 1 _172_ |
| FRANK 160 | | 6.3 | 3.8 | 9.2 | 2.4 | 3.3 | 4.83 | 6 _162_ |
| GREG 140 | | 7.8 | 6.5 | 7.2 | 8.9 | 3.4 | 6.64 | 3 _142_ |

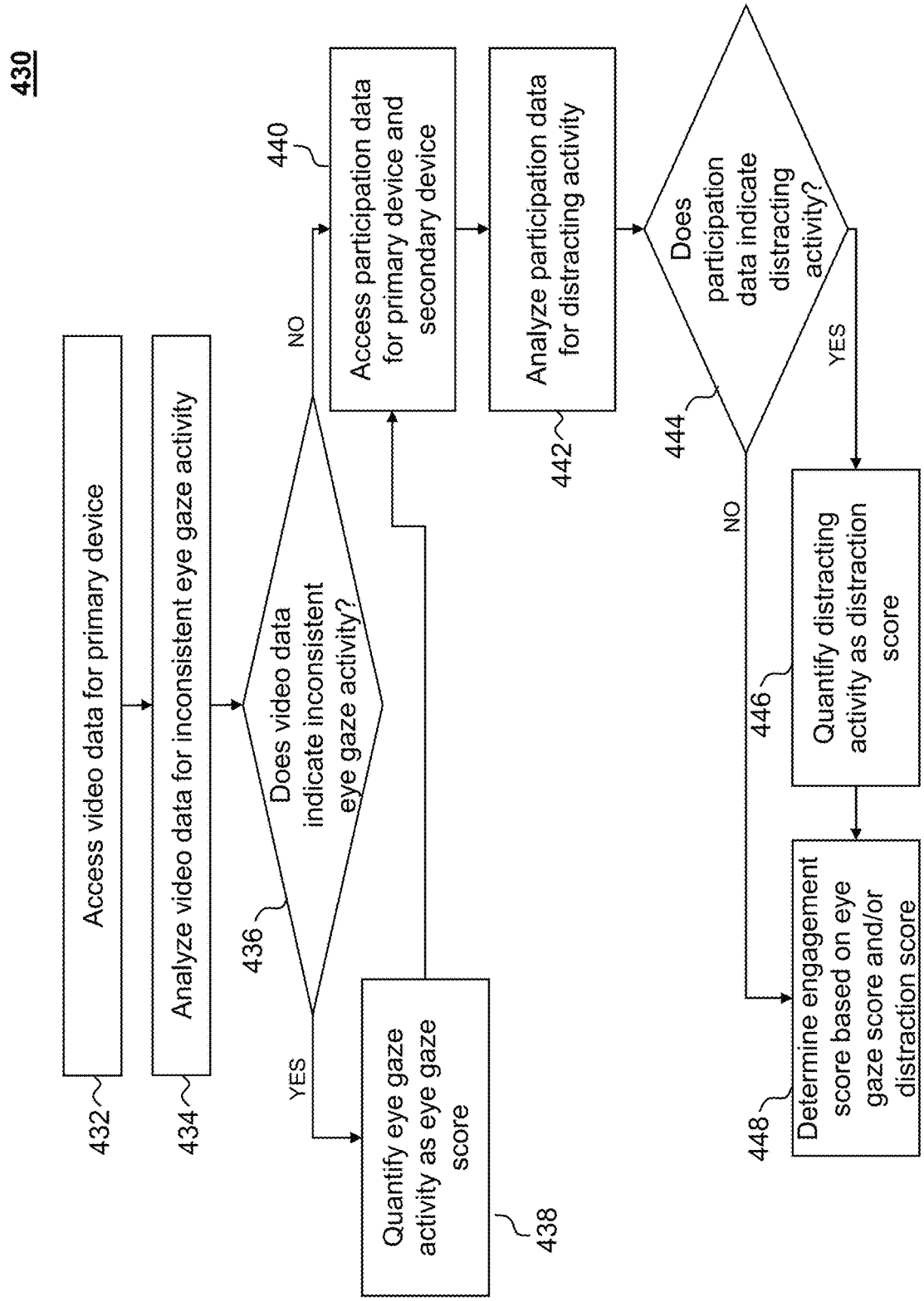

US 11,095,853 B1

SYSTEM AND METHODS TO DETERMINE READINESS IN VIDEO COLLABORATION

BACKGROUND

The present disclosure relates to video conferencing systems, and more particularly to systems and related processes for providing a video conferencing interface.

SUMMARY

Video conferencing enables discussion and collaboration between parties in different locations for various collaborative purposes. No matter what virtual meeting platform is used, issues based in equipment, setup, bandwidth, or user error may complicate participants' interactions and impair a productive meeting. As described herein, an interface able to determine and provide information about each attendee and her device's readiness can improve user experience and promote meeting productivity.

Platforms such as Zoom™, Microsoft® Teams, Skype®, Google Hangouts®, Cisco WebEx Messenger™, Slack®, Apple® FaceTime®, GoToMeeting®, Join.me®, RingCentral™, StarLeaf™, Facebook® Messenger, and others can be used to host online video meetings with parties joining virtually from around the world. Virtual meetings may commonly be referred to video conferencing, online meetings, virtual meeting rooms, video calls, Internet Protocol (IP) video calls, digital teleconferences, or "Zoom Meetings," "Skype Calls," and other names based on a preferred platform name.

Video conferencing is commonly used today because of the increased number of connected devices with cameras and microphones, as well as the large amount of available bandwidth to homes and offices. Parties may use devices, such as computers, telephones, smartphones, tablets, smartwatches, speakers, headphones, microphones, activity trackers, e-readers, voice-controlled devices, servers, televisions, digital content systems, video game consoles, connected video cameras, and other internet-enabled appliances to connect to a network and join a video conference.

Virtual meetings may be used for teaching, planning, discussing, coaching, and other forms of meetings. For instance, a virtual classroom may comprise one or more teachers or professors lecturing to or discussing with several students a lesson on World War II. Similarly, by way of another example, a virtual office meeting may include a manager and several employees collaborating to create a plan for the quarter. Book discussions may be conducted virtually among a group of friends, colleagues, or classmates.

Generally, a web meeting is hosted by a platform server and each meeting attendee can access the meeting via a connected device accessing one or more of a web address, virtual room number, name, or password. In a meeting, video and audio may be shared from each party's device, e.g., via connected video camera, microphone, and/or shared device screen. For instance, a virtual class may have video and audio for each professor, teacher, student, assistant, or other participant, as well as a slide presentation. A virtual office meeting may share video and/or audio from connected cameras and microphones for each of any executives, managers, employees, support staff, or other attendees, as well as a virtual whiteboard shared at times.

In some cases, one or more virtual meeting attendees may be a moderator or host. A designated moderator may have the task of organizing the meeting and/or selecting the next participant member to speak or present. This may be a significant amount of work. In some instances, an organizer may have to prepare an agenda ahead of time with a schedule of presenters and/or speakers. Selecting a participant to speak next is the task of moderator and often a selected participant may not be ready to speak. A participant may not be aware of a queue order and may not know when it is her time to present or speak.

Even with all the preparation efforts and scheduling, a presenter or speaker may not be ready to begin when selected to speak next—and no one may know it before passing the spotlight. For instance, a speaker may be prepared to start but may have intermittent internet connectivity issues during the conference call. A speaker may be prepared to begin but have a loud, distracting child or pet walking through the participant's room. A participant scheduled to speak next may be distracted with other work on the connected computer or with his smart phone. In some instances, a participant may believe she is ready, only to discover that she is too far from the microphone. Even in cases where the sequence for speaking of participants is predetermined, a participant may not be ready due to last minute circumstances during their turn to speak. A participant may be caught off guard if the presenter before her is not able to present, and the moderator skips one or more problematic participants or speakers. Likewise, with an ever-changing speaker schedule, due to issues and disruptions, a participant likely will not be aware of the changing queue order and will probably not know when it is her time to present or speak. Selecting an unprepared participant may disturb meeting flow as the moderator may need to select another participant to speak. Moreover, meeting topics may become out of order, repeated, or missed. Because of unprepared participants listening to an unexpected speaker.

A moderator has no means to recognize if a participant is ready to speak next or not. If the meeting participants were to discover an issue as the participant begins to present, it is too late. If a moderator unknowingly selects a participant with a howling dog in the background, only to discover it when the virtual meeting features the problematic participant, it is a waste of time and effort by all meeting participants. If a moderator has to privately message a participant asking him to focus on the meeting and presenting next, the moderator may lose focus on the meeting. If a participant has an internet connectivity disruption or is too far from the microphone and may not be alerted until starting to present, the meeting can veer off track to address such an issue. If a presenter has a very active background, or a virtual background that may amusingly alter the participant's appearance, the meeting may be distracted. Such issues may also be unprofessional or embarrassing for one or more participants. Waiting until a potentially problematic speaker is next in queue is not efficient.

Some approaches may use a virtual hand raising feature to request to speak next in the meeting, but hand raising does not account for other factors. A participant may raise his hand to request to speak unaware of bandwidth issues, processor challenges, poor microphone placement, or an active visual background, for instance. Hand raising requires extra steps for the moderator to transfer the spotlight, and the moderator must select the next speaker blind of the participants' readiness. Even in situations where the speaking queue is known, a participant may be ready due to last minute circumstances immediately prior to their turn to speak.

Whether a virtual meeting has a moderator or not, there exists a need to determine and provide measures of meeting participant readiness to present or speak next. There are too many avoidable potential pitfalls that can knock a meeting off track or waste time and effort of the participants. In a virtual classroom, precious moments lost to technical difficulties or interruptions may quickly lead to student distractions and failed lessons. In virtual office meetings, inefficient meeting can cost company money and derail progress. In group meetings and discussions, such as therapy or clubs, failure to include speakers when ready or to waste participants' time may discourage attendance at the next meeting. Participants may be patient for many virtual meetings, but everyone in truth desires a more productive and efficient virtual meeting.

As discussed herein are systems and methods of scoring each virtual meeting participant on several criteria and weighting the criteria to determine a readiness score. A user interface for the virtual meeting may display some of the criteria, scores, and identify a dynamic speaker queue. With the user interface, each participant may see which speaker is presenting next. The user interface may also reveal problematic areas that the participant may want to address prior to presenting. The dynamic queue may be adjusted automatically based on constantly updated criteria scores generating new readiness scores. A moderator may use the user interface to adjust the queue based on observed changes in readiness, as well as participant indications of a desire to speak next such as a virtual hand-raise (or a request to present later rather than sooner).

A readiness engine may determine scores for key criteria of readiness, such as network/internet connection strength, audio and visual background activity, microphone proximity, processor speeds and task, and a participant's engagement in the meeting (or distraction with other goings-on).

A solid network/internet connection strength is valuable to all participants during online video calls. A weak internet connection may lead to buffering of video and breaking of audio for the speaking participant, thus leading to a disturbance in the meeting. If a presenting participant is also supposed to share his video or a screen, even more bandwidth may be required. Each participant device may report its current download and upload speeds, as well as Quality of Service (QoS). A readiness engine may monitor the network data of each participant during the meeting to determine a network strength score. Network strength may be normalized on a scale of 0-10 based on all participants in a meeting or all devices connected to a meeting platform.

Each participant having a good background is important to limit meeting distractions. A background may be considered feasible for a participant if there is minimal background audio (noise) and the image background has enough brightness to showcase participants face clearly. A readiness engine may monitor the background audio and video data of each participant to determine a background score. A background score may be adjusted negatively if the lighting levels are dim or if there is excessive noise or action.

The readiness engine may determine background feasibility using various sensors on participant's device and surrounding. For example, a microphone on a participant's device, including smart phones or connected speakers in the room, may capture the noise around a participant. Also, cameras on various devices around a participant may capture and reveal if the surrounding is too active or poorly lighted for a video call.

Engagement in the meeting by all the participants is ideal. In many meetings, however, limiting distracting activities is more practical. Someone playing a game on another monitor may not be ready to present. Someone texting on the phone is not likely ready to present. A readiness engine may monitor the eye gaze of each participant and collect participation data to determine which participants are participating in distracting activity and calculate an engagement score. An eye gaze score may be based on how often a participant looks away from the video camera. A distraction score may be based on how often a participant engages in another application on his computer or on another nearby device such as a smart phone. The readiness engine may combine at least an eye gaze score and a distraction score to determine an engagement score. In some cases, visiting a relevant website or researching a related topic may not hurt an engagement score.

Knowing the distance between a participant and the connected microphone may help identify potential issues with expected presenters. For instance, meeting participants may have difficulty hearing a presenter who is far from his microphone. A far-away microphone may create volume issues and echoes. Moreover, the presenter may not be aware that his microphone is too far. Similarly, if a speaker has stepped away from the virtual meeting, a measure of microphone distance will identify that she is not ready to present next. The readiness engine may determine the distance between the participant and his/her microphone of the device involved for the virtual meeting. The microphone proximity distance may be determined by cameras on devices used for the meeting and surrounding the participant. Position of the microphone may be known, e.g., it may be positioned adjacent to the video camera or on a pair of headphones, and the distance of the presenter may be the determining factor. The participant's distance from the camera may be determined based on known camera specifications and trigonometry. Another way to determine the distance may be to use a wireless connection between the participant's primary device logged into the meeting and a secondary device on the participant's body. For instance, a participant may use his laptop for the meeting and a smartwatch on his arm. Using, for example, Bluetooth signal strength, the readiness engine may calculate the distance between the laptop and the watch on the participant. Similarly, if the participant is using a wireless microphone (e.g., connected to Bluetooth headphones) and attending the virtual meeting via a tablet, then an estimated distance between the tablet and microphone may be the basis for a microphone proximity score.

In many cases a device connected to the meeting may be performing parallel processes while the participant is on the call. Processing power may identify the availability of CPU on the participant's device used for online call. Processing power availability may be crucial for a speaker who is about to present. If a device is running many other parallel processes, the CPU may be over-shared and may not support the user to speak or share video during the call. In some instances, a taxed CPU may trigger a noisy fan that could obscure audio. Processing power, and availability of CPU, may be readily determined by the readiness engine through system monitoring and relaying of processing data and measurements.

Once the key criteria of readiness, such as network/internet connection strength, audio and visual background activity, microphone proximity, processor speeds and task, and a participant's engagement in the meeting (or distraction with other goings-on), are determined a readiness engine may calculate a readiness score. The readiness engine may weight and combines criteria scores to determine a readiness score for each participant. For instance, each score category may have a corresponding weight value, such as a percentage. By multiplying the weights of each category with the participant's score, and taking the sum, a readiness score may be determined. Weights may be adjusted depending on a platform or moderaor's settings. In some embodiments, engagement score may be the most important score and weighted accordingly. In some embodiments, network strength may be the biggest factor. Also, in some embodiments, microphone proximity may be less important (e.g., everyone is wearing a headset) and may be weighted less. A table, spreadsheet, or database may be used to store each criteria score and calculate a readiness score for each participant.

The readiness engine may generate and present criteria scores, readiness scores, rank, and queues as part of a user interface. A user interface with readiness scores may limit participation problems, errors, miscues, technical glitches, and distractions to make a virtual meeting more efficient and more productive.

A readiness score may be used to dynamically queue participants who are ready to speak or present. In some embodiments, a readiness score may be a tool for a moderator to identify who is ready to present and who is not. In some instances, a readiness engine may automatically update each participant's readiness score regularly and adjust the dynamic queue automatically. For instance, a queue may be re-ranked every few minutes. In some embodiments, a participant with a low readiness score may be bumped or moved to later. A participant with a high readiness score may take a lower scoring participant's slot for the time being. In some embodiments, alerts may be provided to a moderator or individual participants if a criteria score is too low to proceed as an upcoming presenter.

Described herein is system or method of prioritizing participants in a virtual meeting via a network by scoring each participant on several criteria and weighting the criteria to determine a readiness score and present the most-ready participants. The system of accesses, for each of a plurality of participants, network data, video data, audio data, processing data, and participation data. The system determines, for each of the plurality of participants, a signal strength score based on the corresponding network data, a background score based on the corresponding video data and audio data, a microphone proximity score based on the corresponding video data, a processing score for each of the plurality of participants based on the corresponding processing data, and an engagement score based on the corresponding video data and participation data. The system calculates the readiness score, for each participant, based at least on the corresponding signal strength score, background score, engagement score, and processing score, ranks the participants, and provides the ranked participants.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1B depicts an illustrative table for determining readiness of meeting participants, in accordance with some embodiments of the disclosure;

FIG. 4B depicts an illustrative flowchart of a process for determining an engagement score of a meeting participant, in accordance with some embodiments of the disclosure;

DETAILED DESCRIPTION

Figure 1A:
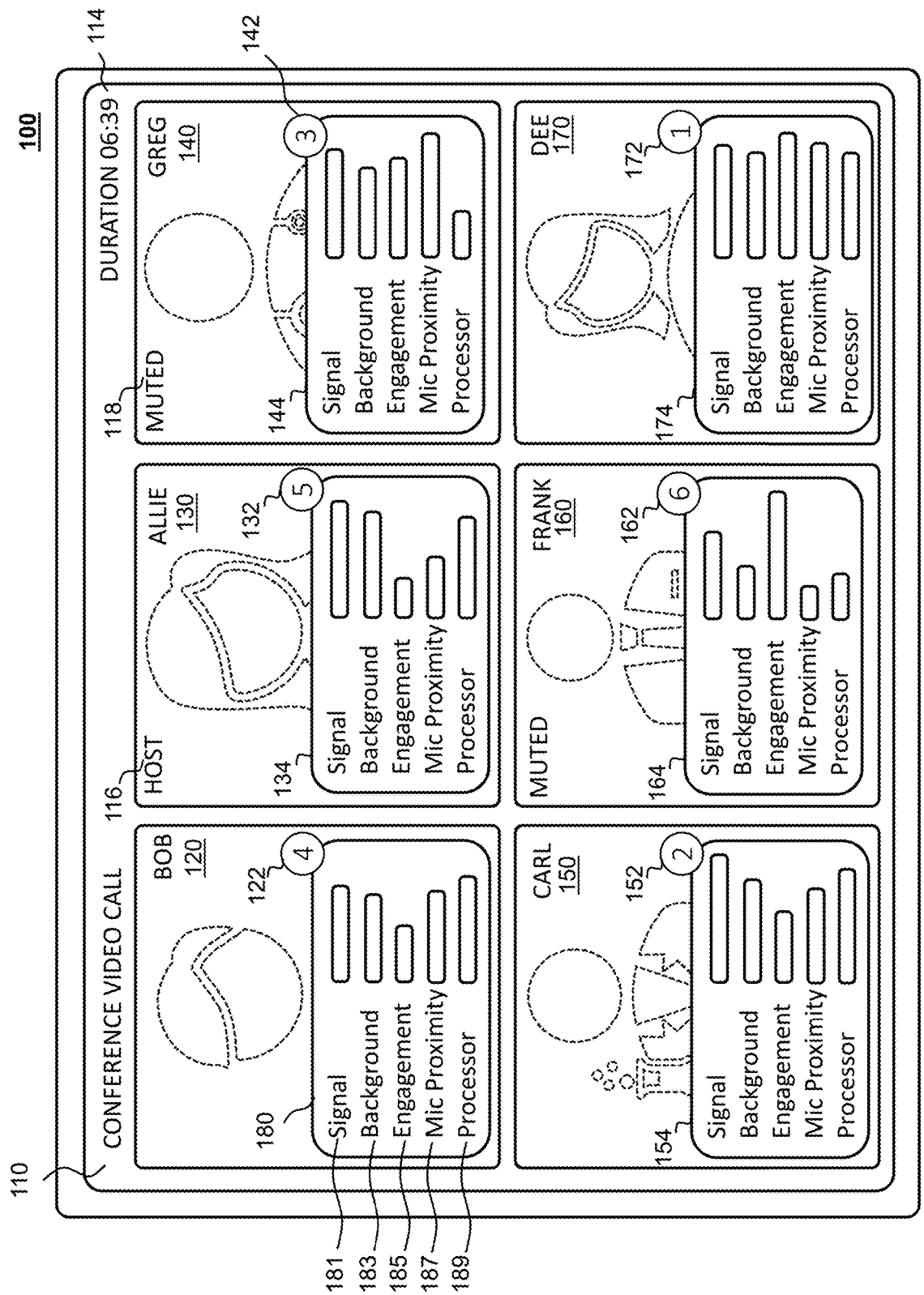
FIG. 1A depicts an illustrative user interface for determining readiness of meeting participants, in accordance with some embodiments of the disclosure.

FIG. 1A depicts an illustrative user interface for determining readiness of meeting participants, in accordance with some embodiments of the disclosure. Scenario 100 of FIG. 1A illustrates user interface 110 of a virtual meeting. In scenario 100, user interface 110 presented on a computer screen. By way of a non-limiting example, scenario 100 may depict determining and presenting readiness of meeting participants based on calculating a readiness score. For instance, user interface 110 may present representations of scores for a plurality of measurements for each participant, determine a readiness score for each participant, and rank participants in a readiness score order.

User interface 110, for example, comprises six participant regions, Allie 130, Bob 120, Carl 130, Dee 170, Frank 160, and Greg 140, for each of six participants. In some embodiments, there may be more participants, e.g., on a separate screen or fit onto a single screen, and user interface 110 may have to scroll to display more participants. User interface 110 may include features such as duration 114 indicating "06:39" as the meeting timer, host indicator 116, mute indicator 118, as well as other interactive options and virtual meeting features not pictured, e.g., to minimize complexity of the illustration. User interface 110 may be presented on devices of one or more virtual meeting participants, but user interface 110 may be most helpful to a moderator or host—Allie 130, in this instance.

Each participant region of user interface 110 includes a scorecard, such as exemplary scorecard 180. Scorecard 134 corresponds to Allie 130, scorecard 124 corresponds to Bob 120, scorecard 134 corresponds to Carl 130, scorecard 174 corresponds to Dee 170, scorecard 164 corresponds to Frank 160, and scorecard 144 corresponds to Greg 140.

Scenario 100, for example, illustrates scorecard 180 for each participant as overlaying a corresponding video image of each participant. For instance, scorecard 180 overlays the image in the region labeled Bob 120 and scorecard 134 overlays the image in the region labeled Allie 130. In some embodiments, each scorecard 180 may only be visible after input such as a selection, click, or hover of a cursor.

Each of the scorecards, including scorecard 180, features bar representations corresponding participant's signal strength score 181, background score 183, engagement score 185, microphone proximity score 187, and processor score 189. In some embodiments, each participant, and each corresponding scorecard 180, may include more or fewer scores. In scenario 100, scorecard 180 includes a bar representing each of scores 181-189 for each participant. In some embodiments, scorecard 180 may include a numeric score for each of scores 181-189 instead of, or in addition to, a bar representation.

Scenario 100, for example, further illustrates ranking 122, 132, 142, 152, 162, and 172. Such ranking may be based on a readiness score and may be an indication of which participant is most ready to speak next. For instance, ranking 122 of the region labeled Bob 120 indicates a ranking of "4," so Bob 120 may be fourth in line to speak at this point in time. In user interface 110, ranking 172 indicates Dee 170 would be first, ranking 152 indicates Carl 150 would be second, ranking 142 indicates Greg 140 would be third, ranking 122 indicates Bob 120 would be fourth, ranking 132 indicates Allie 130 would be fifth, and ranking 162 indicates Frank 160 would be sixth, at this point in time. Ranking 122 may be based on a calculated readiness score, e.g., a weighted combination of numeric score for each of scores 181-189. Some embodiments may use Table 101 as depicted in FIG. 1B to determine and rank readiness scores.

FIG. 1B depicts an illustrative table for determining readiness of meeting participants, in accordance with some embodiments of the disclosure. Table 101 of FIG. 1B depicts virtual meeting participants, their associated scores, a calculated readiness score, and a ranking. For explanatory purposes, Table 101 features data of participants depicted in Scenario 100 of FIG. 1A, however more/fewer/different participants and/or scores may be used in Table 101.

Table 101 includes a row for each of six participants, Allie 130, Bob 120, Carl 130, Dee 170, Frank 160, and Greg 140. Table 101 includes a column for each score category, such as signal strength score 181, background score 183, engagement score 185, microphone proximity score 187, and processor score 189. In a cell above each score category is a corresponding weight value. For instance, in Table 101, signal strength score 181 has weight value 191 of 0.25, background score 183 weight value 193 of 0.15, engagement score 185 weight value 195 of 0.15, microphone proximity score 187 weight value 197 of 0.20, and processor score 189 weight value 199 of 0.25. In some embodiments, each of weights 191, 193, 195, 197, and 199 may be different. In some embodiments, each of weights 191, 193, 195, 197, and 199 may be adjustable in moderator or administrative settings. The sum of weight values 191, 193, 195, 197, and 199 is 1.0 in Table 101, but other numbers or normalization techniques may be used. Table 101 also includes calculated columns of readiness score 190 and determined rank 192.

Each corresponding readiness score 190 may be calculated by multiplying each of signal strength score 181, background score 183, engagement score 185, microphone proximity score 187, and processor score 189 with a corresponding weight and taking the sum. For instance, Bob 120 has a readiness score 190 of "6.37" as determined by the mathematical expression: 0.25(6.9)+0.15(6.3)+0.15(4.1)+0.2(6.6)+0.25(7.7). Based on each readiness score 190 in Table 101, rank 192 may be determined. For instance, Dee 170 has the highest rank, rank 172, of "1" based on the readiness score 190 of "8.08," as calculated by the mathematical expression: 0.25(8.1)+0.15(7.6)+0.15(9.0)+0.2(8.3)+0.25(7.6).

Figure 2:
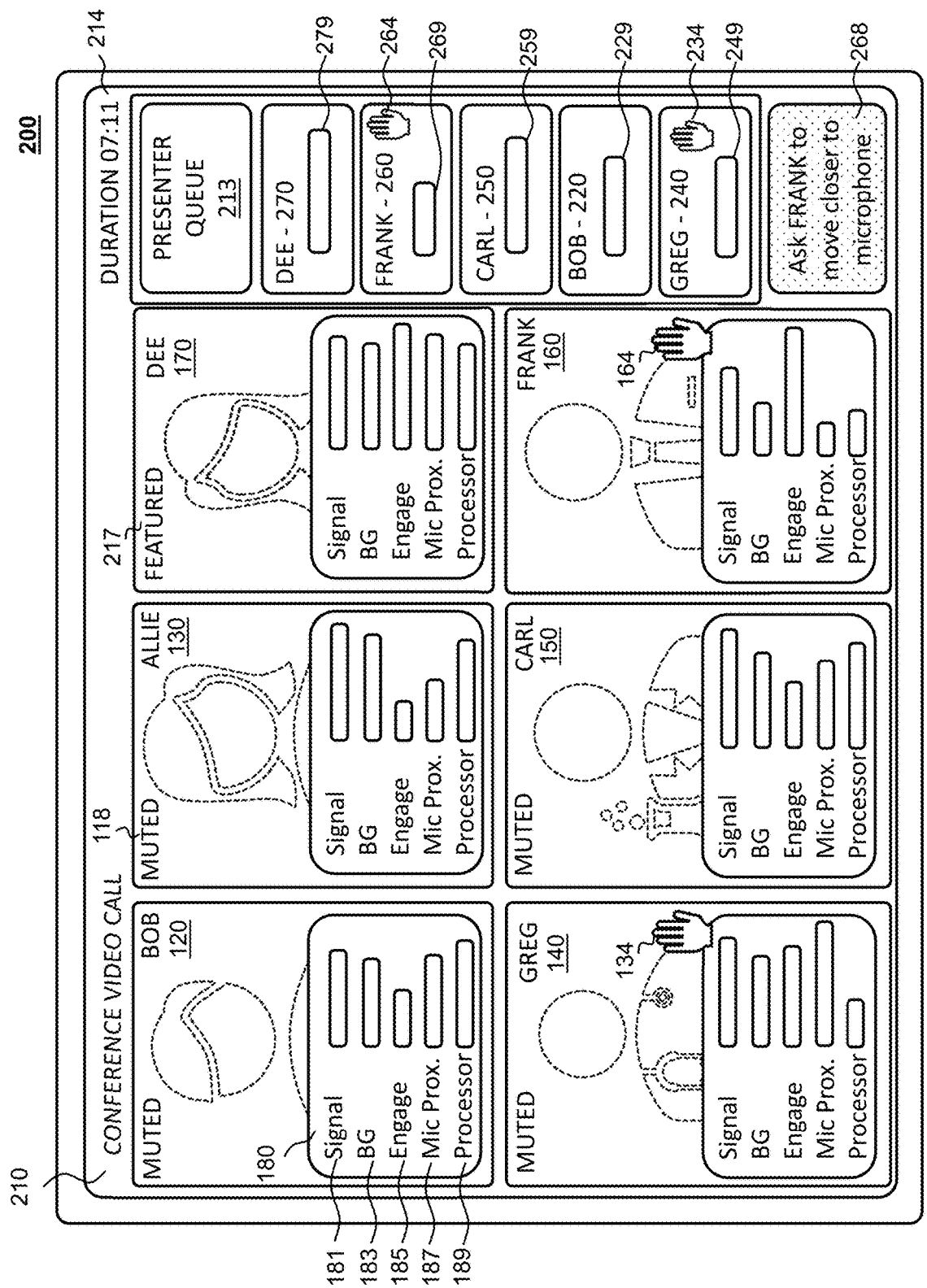
FIG. 2 depicts an illustrative user interface for determining readiness of meeting participants, in accordance with some embodiments of the disclosure.

FIG. 2 depicts an illustrative user interface for determining readiness of meeting participants, in accordance with some embodiments of the disclosure. Scenario 200 of FIG. 2 illustrates user interface 210 of a virtual meeting. In scenario 200, user interface 210 presented on a computer screen. By way of a non-limiting example, scenario 200 may depict determining and presenting readiness of meeting participants based on calculating a readiness score. For instance, user interface 210 may present representations of scores for a plurality of measurements for each participant, determine a readiness score for each participant, and rank participants in a readiness score order. User interface 210 includes presenter queue 213.

User interface 210, for example, comprises six participant regions, Allie 130, Bob 120, Carl 130, Dee 170, Frank 160, and Greg 140, for each of six participants. In some embodiments, there may be more participants, e.g., on a separate screen or fit onto a single screen, and user interface 210 may have to scroll to display more participants. User interface 210 may include features such as duration 214 indicating "07:11" as the meeting timer, mute indicator 118, as well as other interactive options and virtual meeting features not pictured, e.g., to minimize complexity of the illustration. User interface 210 may be presented on devices of one or more virtual meeting participants, but user interface 210 may be most helpful to a moderator or host—particularly presenter queue 213.

Each participant region of user interface 210 includes a scorecard, such as exemplary scorecard 180. Scenario 200, for example, illustrates scorecard 180 for each participant as overlaying a corresponding video image of each participant. For instance, scorecard 180 overlays the image in the region labeled Bob 120. In some embodiments, each scorecard 180 may only be visible after input such as a selection, click, or hover of a cursor.

Each of the scorecards, including scorecard 180, features bar representations corresponding participant's signal strength score 181, background score 183, engagement score 185, microphone proximity score 187, and processor score 189. In some embodiments, each participant, and each corresponding scorecard 180, may include more or fewer scores. In scenario 200, scorecard 180 includes a bar representing each of scores 181-189 for each participant.

Scenario 200, for example, further illustrates ranking in presenter queue 213. Presenter queue 213 of user interface 210 includes regions Dee 270, Frank 260, Carl 250, Bob 220, and Greg 240, from top to bottom. Each region of presenter queue 213 includes a bar representation of the corresponding readiness score. In scenario 200, each readiness score corresponds to readiness score of Table 101 in FIG. 1B. In presenter queue 213, Dee 270 has bar 279 corresponding to a readiness score of 8.08, Frank 260 has bar 269 corresponding to a readiness score of 4.83, Carl 250 has bar 259 corresponding to a readiness score of 7.59, Bob 220 has bar 229 corresponding to a readiness score of 6.53, and Greg 240 has bar 249 corresponding to a readiness score of 6.64.

In some embodiments, presenter queue 213 is automatically ranked. In some embodiments, presenter queue 213 may be manually reordered, e.g., with drag and drop by a meeting moderator. In some embodiments, presenter queue 213 may be weighted additionally by requests to speak, as indicated by hand 134 and hand 164. For instance, in Scenario 200, Frank 260 appears second in presenter queue 213. Frank 160 has a corresponding rank as "6" according to rank 162 in FIGS. 1A and 1B, with a readiness score 190 of "4.83." In Scenario 200, however, the region of user interface 210 for Frank 160 includes hand 164 signifying a request to speak soon. In some embodiments, presenter queue 213 may be manually reordered via drag and drop of Frank 260 by a moderator or host. In some embodiments, presenter queue 213 may be automatically reordered for the first participant who virtually raises his or her hand.

User interface 210 also includes notification 268 displaying "Ask FRANK to move closer to microphone." As depicted in the corresponding bar of user interface 210, as well as Table 101 of FIG. 1B, Frank 160 has a microphone proximity score of 2.4, indicating Frank 160 is too far from the microphone compared to the other participants. In some embodiments, the readiness engine may use a process like one or more of Process 450 depicted in FIG. 4C, Process 460 depicted in FIG. 4D, or Process 470 depicted in FIG. 4E to determine a microphone proximity score 187.

Figure 3:
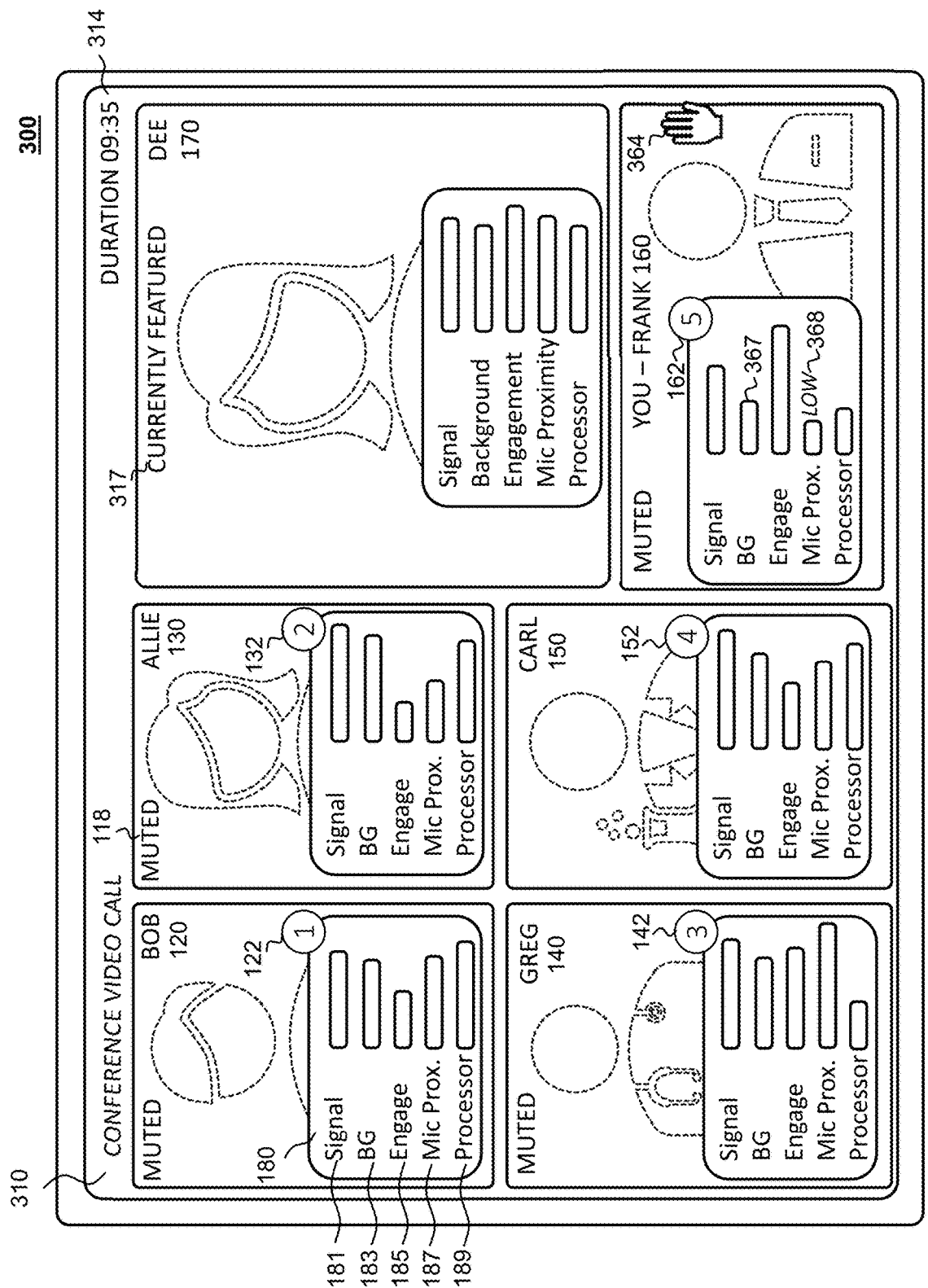
FIG. 3 depicts an illustrative user interface for determining readiness of meeting participants, in accordance with some embodiments of the disclosure.

FIG. 3 depicts an illustrative user interface for determining readiness of meeting participants, in accordance with some embodiments of the disclosure. Scenario 300 of FIG. 3 illustrates user interface 310 of a virtual meeting. In scenario 300, user interface 310 presented on a computer screen. By way of a non-limiting example, scenario 300 may depict determining and presenting readiness of meeting participants based on calculating a readiness score. For instance, user interface 310 may present representations of scores for a plurality of measurements for each participant, determine a readiness score for each participant, and rank participants in a readiness score order. User interface 310 is a typical view for a participant such as Frank 160.

User interface 310, for example, comprises six participant regions, Allie 130, Bob 120, Carl 130, Dee 170, Greg 140, and Frank 160, for each of six participants. In some embodiments, there may be more participants, e.g., on a separate screen or fit onto a single screen, and user interface 310 may have to scroll to display more participants. User interface 310 may include features such as duration 314 indicating "09:35" as the meeting timer, mute indicator 118, as well as other interactive options and virtual meeting features not pictured, e.g., to minimize complexity of the illustration. User interface 110 may be presented on devices of one or more virtual meeting participants, but user interface 110 is a typical view for an attendee such as Frank 160, not necessarily a moderator or host.

Each participant region of user interface 310 includes a scorecard, such as exemplary scorecard 180. Scenario 300, for example, illustrates scorecard 180 for each participant as overlaying a corresponding video image of each participant. For instance, scorecard 180 overlays the image in the region labeled Bob 120. In some embodiments, each scorecard 180 may only be visible after input such as a selection, click, or hover of a cursor.

Each of the scorecards, including scorecard 180, features bar representations corresponding participant's signal strength score 181, background score 183, engagement score 185, microphone proximity score 187, and processor score 189. In some embodiments, each participant, and each corresponding scorecard 180, may include more or fewer scores. In scenario 200, scorecard 180 includes a bar representing each of scores 181-189 for each participant.

Scenario 300, for example, further illustrates ranking 122, 132, 142, 152, 162, and 172. Such ranking may be based on a readiness score and may be an indication of which participant is most ready to speak next. For instance, ranking 122 of the region labeled Bob 120 indicates a ranking of "4," so Bob 120 may be fourth in line to speak at this point in time. In user interface 110, ranking 172 indicates Dee 170 would be first, ranking 152 indicates Carl 150 would be second, ranking 142 indicates Greg 140 would be third, ranking 122 indicates Bob 120 would be fourth, ranking 132 indicates Allie 130 would be fifth, and ranking 162 indicates Frank 160 would be sixth, at this point in time. Ranking 122 may be based on a calculated readiness score, e.g., a weighted combination of numeric score for each of scores 181-189. Some embodiments may use Table 101 as depicted in FIG. 1B to determine and rank readiness scores.

User interface 310 includes a larger region for Frank 160 so that the participant may view his camera capture more easily. Moreover, in Scenario 300, the region of user interface 310 for Frank 160 includes hand 364 signifying an option to request to speak soon. In some embodiments, a presenter queue may be manually reordered by a moderator or host who may see an indication of hand 364 of Frank 160. In some embodiments, presenter queue 213 may be automatically reordered for the first participant who virtually raises his or her hand.

Region for Frank 160 of user interface 310 also includes alert 368 and alert 367. Alert 368 may indicate that the microphone proximity score is too low, and that the participant should move closer to the microphone. Alert 367 may indicate that the background score is low and that the participant should reduce background noise and visual activity. In some embodiments other alerts may appear, such as an alert indicating a low engagement score, and that the participant should focus more on the meeting and less on other activities. In some embodiments, an alert may indicate that the processor score is low and that the participant should reduce processing activities to improve the processor score. Alerts may be set as thresholds by, e.g., administrators, moderators, and/or participants.

Figure 4A:
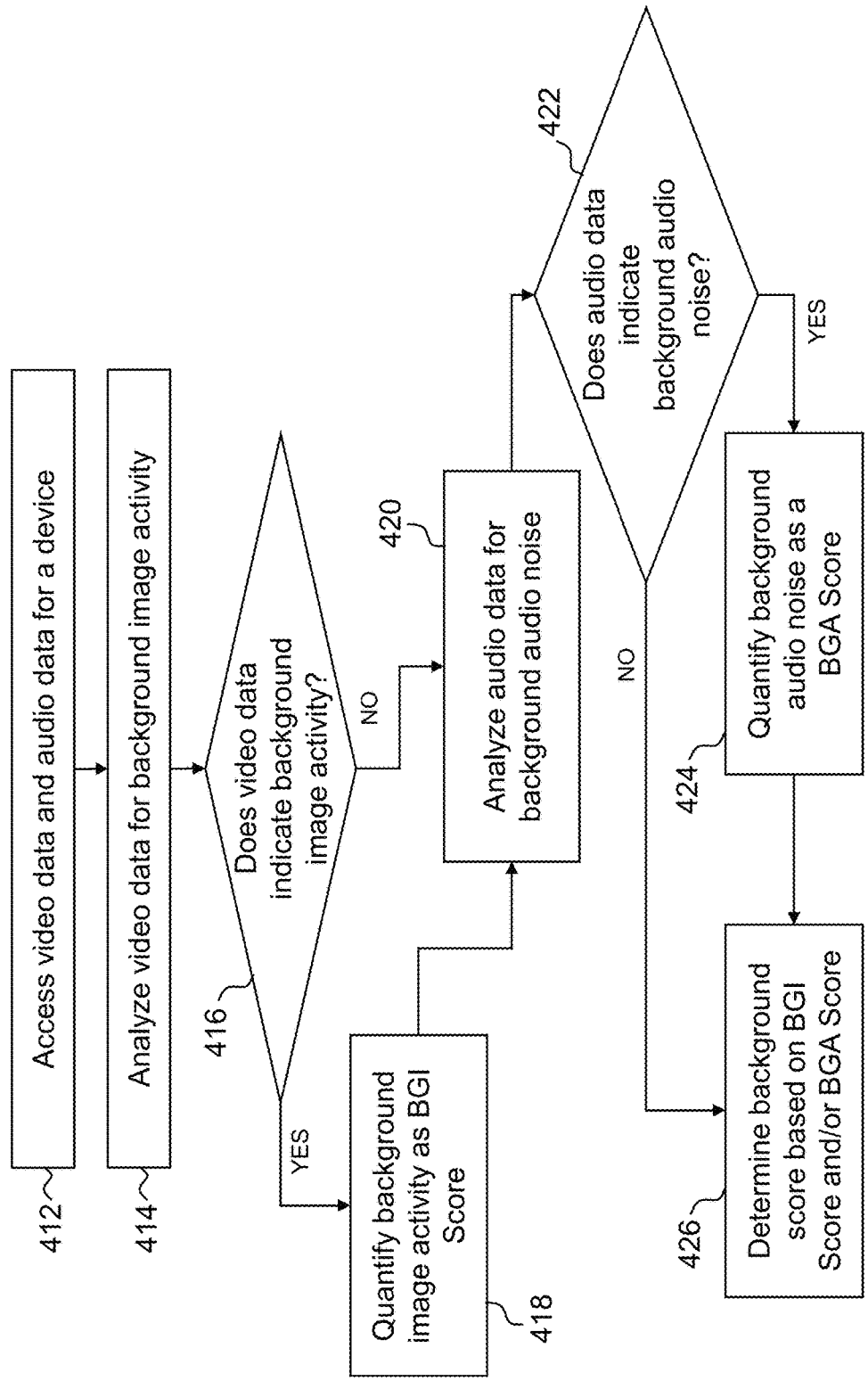
FIG. 4A depicts an illustrative flowchart of a process for determining a background score of a meeting participant, in accordance with some embodiments of the disclosure.

FIG. 4A depicts an illustrative flowchart of a process for determining a background score of a meeting participant, in accordance with some embodiments of the disclosure. There are many ways to determine a background score for a participant, and Process 410 of FIG. 4A is an exemplary process to determine a background score based on video data and audio data. Background motion and activity can be distracting to the speaking and observing attendees. An attendee with a lot of background activity may not be ready to present. Quantifying background activity may be based on visual and auditory signs of activity, and may be used as a factor for a readiness score.

Figure 6:
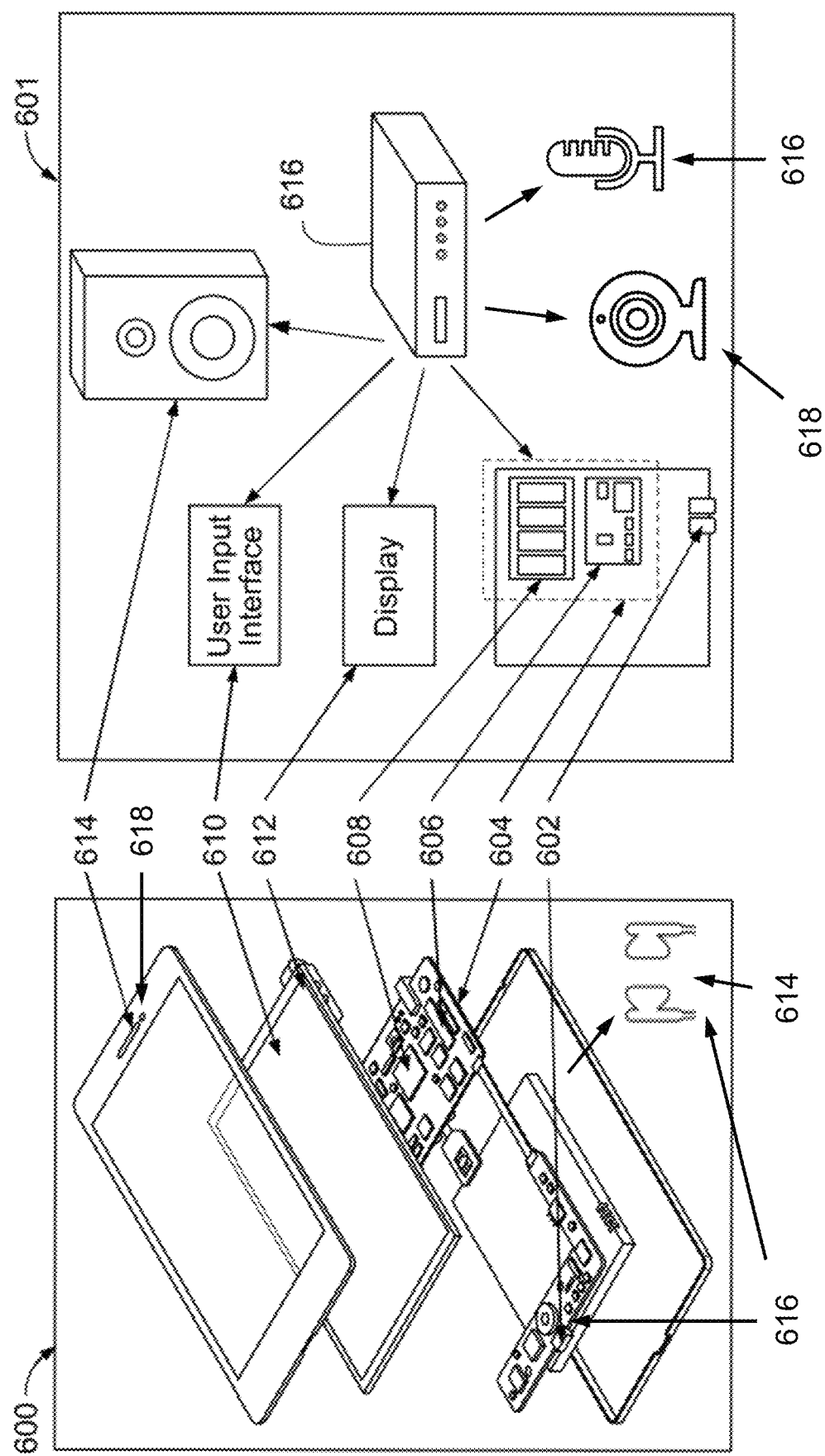
FIG. 6 is a diagram of illustrative devices, in accordance with some embodiments of the disclosure.
Figure 7:
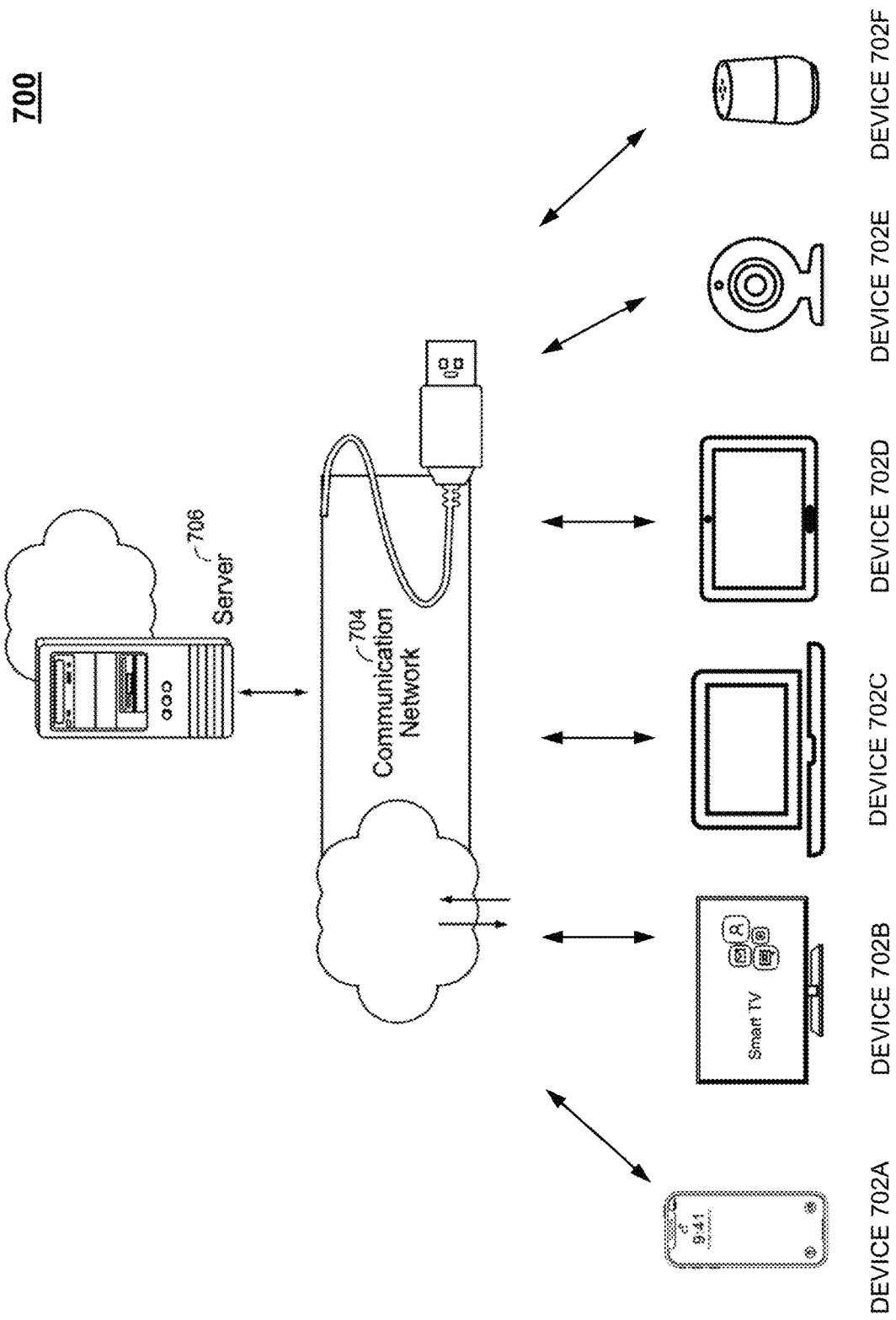
FIG. 7 is a diagram of an illustrative system, in accordance with some embodiments of the disclosure.

Some embodiments may utilize a readiness engine to perform one or more parts of Process 410, e.g., as part of a video conference or virtual meeting application, stored and executed by one or more of the processors and memory of a device and/or server such as those depicted in FIGS. 6 and 7. For instance, a readiness engine may run on a server of a platform hosting a virtual meeting and relay some or all data and score calculations to one or more moderators or participants. In Process 410 a device may be a primary device with which a participant is connecting to the virtual meeting or a secondary device used simultaneously with a primary device. For instance, in Process 410 a device may be a laptop used to join a virtual meeting or a smart phone in the same room. In some implementations of Process 410, for example, a primary device or secondary device may be a smart phone, tablet, laptop, computer, smart television, smart watch, or network-connected camera.

At step 412, a readiness engine accesses video data and audio data for a device. For instance, the readiness engine may access the audio and video feeds from a microphone and a camera connected to the device. The readiness engine may access video data and audio data for each attendee's device, e.g., as it is transmitted or buffered through a platform server. In some embodiments, the device may combine audio and video data as a multimedia data stream, accessible by the readiness engine. In some embodiments, the device may separate audio data and video data from a multimedia data stream for analysis. In some cases, a participant may be muted, and audio data may not be transmitted from the participant device to the meeting platform servers. Muting may indicate a high level of background activity and/or a low level of readiness. Still, in some instances, a readiness engine may access the captured audio data from the device prior to muting or may access audio data from a nearby device such as a smartphone, smart watch, or smart speaker with a digital assistant. In such examples, there may be privacy issues and permission may have to be granted, but a readiness engine may be used locally to access and quantify sensitive data safely and/or anonymously. Similarly, if a participant's video camera is shut off, such as necessary semi-private moment like closing a door before a pet wanders in, a readiness engine may be able to still access video from one or more device, e.g., with permission, and determine activity.

At step 414, the readiness engine analyzes video data for background image activity. For instance, the readiness engine may compare image frames of video to reveal motion over a period of time. Generally, motion detection may be performed by looking at the difference between the existing frame and a reference frame. For example, if the video is captured in 30 frames per second, the readiness engine can look at each of the 30 frames to determine if there is motion in each of the frames. The readiness engine can also analyze samples from the 30 frames per second over a period of time, e.g., 10 seconds, and determine if there is motion throughout or in part(s) of the duration. Moreover, analysis of video data for background image activity may determine the lighting is too dim or other image issues that could distract in a meeting.

At step 416, the readiness engine determines if the video data indicates background image activity. If there is a non-negligible amount of background image activity, the readiness engine, at step 418, quantifies background image activity as a BGI Score. For instance, analyzing samples from 30 frames per second over a period of, e.g., 10 seconds, may reveal a background motion during the entire 10 seconds. This may indicate a BGI Score of 10. As another example, analyzing samples from 30 frames per second over a period of, e.g., 10 seconds, may reveal background motion for 4.2 seconds, which may produce a BGI Score of 4.2. In some embodiments, a BGI Score may be inverted, and samples with background motion for 3.8 seconds of the 10 seconds may merit a BGI Score of 6.2. Some embodiments may calculate a BGI Score differently. Other ways to quantify background image activity as a BGI Score may involve analyzing at different durations, sample rates, and degrees of differences between frames. Once a BGI Score is quantified, or it is determined there is no background image activity, the readiness engine advances to step 420. A BGI Score may also take into account brightness level of the image to ensure a participant is visible. For instance, a BGI Score may be adjusted negatively if the lighting levels are dim.

At step 420, the readiness engine analyzes audio data for background audio noise. Generally, detecting noise may be performed by looking at the wave form of captured sound. Sounds may be filtered to identify the speaker's voice and then background noises may be accounted for. The readiness engine may analyze a sound using a Fast Fourier Transform (FFT) to reveal noises in the sound wave. In some embodiments, the readiness engine may access the audio captured for the virtual meeting, or audio captured by another nearby device like a smart phone or virtual assistant device, and analyze for background audio noise. Audio may be captured, for example in the 16 to 48 kHz range. Audio may be sampled and analyzed based on occurrences of noises, as well as amplitude of each noise.

At step 422, the readiness engine determines if the audio data indicates background audio noise and, if there is non-negligible background audio noise, at step 424, the readiness engine quantifies the background audio noise as BGA Score. For instance, in a 10 second audio sample, if there is noise for all 10 seconds, a BGA Score may be 10. In a 5 second audio sample, if there is noise for only 3.2 seconds, a BGA Score may be 6.4. In some embodiments, a BGA Score may be inverted, and samples with background noise for 4.2 seconds of the 10 seconds may merit a BGA Score of 5.8. A score of 5.8 indicating noises for 4.2 seconds of a 10 second sample, may be too high on some scales, depending on how loud the noise is, and it may need to be normalized before being incorporated in a readiness score. Some embodiments may calculate a BGA Score differently. Other ways to quantify background image activity as a BGA Score may involve analyzing at different durations, sample rates, or thresholds for noises. Once a BGA Score is quantified, or it is determined there is no background audio noise, the readiness engine advances to step 426.

At step 426, the readiness engine determines a background score based on the BGI Score and/or the BGA Score. Depending on the scales, a participant with a very active video and audio background may have a BGI Score of 10 (lot of motion) and the BGA Score of 10 (lot of noise), so the determined background score should be normalized as low, e.g., 0 on a scale of 1 to 10, to indicate a lack of readiness for the participant. In some embodiments, a background score may be the average of the two BGI Score and the BGA Score, subtracted from 10. For example, a BGI Score of 4.2 and the BGA Score of 6.4 may produce a background score of 4.7 out of 10. Such a background score may indicate that there is a fair amount of background issues. In some cases, if either the audio or video is muted, the background score may indicate a lack of readiness with a low score. A background score may be calculated in many ways, including as a weighted average BGI Score and/or the BGA Score.

FIG. 4B depicts an illustrative flowchart of a process for determining an engagement score of a meeting participant, in accordance with some embodiments of the disclosure. There are many ways to determine an engagement score for a participant, and Process 430 of FIG. 4B is an exemplary process to determine an engagement score based on video data and participation data. Lack of eye gaze and participation in non-meeting activity may indicate a lack of readiness, and can be distracting to the speaking and observing attendees. An attendee with minimal eye gaze and/or a lot of outside activity may not be ready to present. Quantifying distracting activity may be based on visual signs of activity, as well as participation data or activity data from one or more devices, and may be used as a factor for a readiness score.

Some embodiments may utilize a readiness engine to perform one or more parts of Process 430, e.g., as part of a video conference or virtual meeting application, stored and executed by one or more of the processors and memory of a device and/or server such as those depicted in FIGS. 6 and 7. For instance, a readiness engine may run on a server of a platform hosting a virtual meeting and relay some or all data and score calculations to one or more moderators or participants.

In Process 430 a primary device may be a device with which a participant is connecting to the virtual meeting and a secondary device may be any device used simultaneously with, but different from, the primary device. For instance, in Process 430 a primary device may be a laptop and the secondary device may be a smart phone in the room. In some implementations of Process 430, for example, a secondary device may be a smart phone, tablet, laptop, computer, smart television, smart watch, or network-connected camera, while a primary device may be a computer, laptop, smart television, tablet, or smart phone.

At step 432, a readiness engine accesses video data for a primary device. For instance, the readiness engine may access the video feed from a camera connected to the participant's device connected to the meeting. The readiness engine may access video data for each attendee's device, e.g., as it is transmitted or buffered through a platform server. In some embodiments, the device may combine audio and video data as a multimedia data stream, accessible by the readiness engine. In some embodiments, the device may separate video data from a multimedia data stream for analysis. In some cases, a participant may mute her video, which may indicate a high level of background activity and/or a low level of readiness. Still, in some instances, a readiness engine may access the captured video stream from the device prior to muting or may access video data from a nearby device such as a smartphone, smart watch, or smart speaker with a digital assistant. In such examples, there may be privacy issues and permission may have to be granted, but a readiness engine may be used locally to access and quantify sensitive data safely and/or anonymously.

At step 434, the readiness engine analyzes video data for inconsistent eye gaze activity. Eye gaze may be tracked by various methods. In some embodiments, the readiness engine may use video-based eye tracking, which may track, e.g., pupil movement. Some embodiments may track reflections of the pupil or lens. In some embodiments, the readiness engine may compare image frames of video to reveal eye movement over a period of time. The more eye motion and lack of eye focus, the more inconsistent the eye gaze activity. For example, if the video is captured in 30 frames per second, the readiness engine can look at each of the 30 frames to determine if there is eye motion/lack of focus on the meeting in each of the frames. The readiness engine can also analyze samples from the 30 frames per second over a period of time, e.g., 10 seconds, and determine if there is eye motion or a lack of focus throughout or in part(s) of the duration.

At step 436, the readiness engine determines if the video data indicates inconsistent eye gaze activity. If there is a non-negligible amount of eye gaze activity, the readiness engine, at step 438, quantifies background image activity as an eye gaze score. For instance, analyzing samples from 30 frames per second over a period of, e.g., 10 seconds, may reveal eye motion and/or lack of focus for 10 seconds. This may indicate a poor eye gaze score of 10. As another example, analyzing samples from 30 frames per second over a period of, e.g., 10 seconds, may reveal background motion for 2.1 seconds, which may produce a better eye gaze score of 2.1. In some embodiments, an eye gaze score may be inverted, and samples with background motion for 3.9 seconds of the 10 seconds may merit an eye gaze score of 6.1. Some embodiments may calculate an eye gaze score differently. Other ways to quantify background image activity as an eye gaze score may involve analyzing at different durations, sample rates, and degrees of differences between frames. Once an eye gaze score is quantified, or it is determined there is no inconsistent eye gaze activity (the participant is focused on the meeting), the readiness engine advances to step 440.

At step 440, the readiness engine accesses participation data from each of the primary device and the secondary device. The readiness engine must access participation data or activity data to determine if the participant of performing activities on the primary device or the secondary device outside of the virtual meeting. For instance, a participant may be playing solitaire on the laptop she is using as the primary device to connect to the meeting or a participant may be sending text messages on a separate smart phone. Participation data may come in many forms, such as a list of open applications and/or task for one or more devices. Some embodiments may collect data of interaction with one or more applications as participation data.

At step 442, the readiness engine analyzes participation data for distracting activity. Distracting activity may be any activity not related to the virtual meeting. For instance, the readiness engine may access the activities captured by each of a primary device and one or more secondary devices during the virtual meeting. Participation data may be captured as samples, e.g., every few seconds or minutes. The readiness engine may identify distracting activity as time spent on activities not related to the meeting. If participation data indicates a participant is interacting with application outside of the meeting application, it may be considered distracting activity by the readiness engine. In some embodiments, the readiness engine may distinguish a participant internet shopping for holiday gifts from researching a topic on the internet, e.g., by web domain. Activities falling outside of meeting-related activities may be set in setting by, e.g., an administrator or meeting moderator.

At step 444, the readiness engine determines if the participation data indicates any distracting activity and, if there is non-negligible distracting activity, at step 446, the readiness engine quantifies the distracting activity as a distraction score. For instance, in a 10 second activity sample, if there is non-meeting activity (e.g., interaction with an application unrelated to the meeting) for all 10 seconds, a distraction score may be 10. In a 5 second activity sample, if there is distracting activity for only 1.1 seconds, a distraction score may be 2.2. In some embodiments, a distraction score may be inverted, and samples with distracting activity for 1.5 seconds of the 10 seconds may merit a distraction score of 8.5. A score of 8.5 indicating distracting activity for 1.5 seconds of a 10 second sample, may be too high on some scales, depending on how distracting the activity is, and it may need to be normalized before being incorporated in a readiness score. Some embodiments may calculate a distraction score differently. Other ways to quantify background image activity as a distraction score may involve analyzing at different durations, sample rates, or thresholds for non-meeting activity. Once a distraction score is quantified, or it is determined there is no distracting activity, the readiness engine advances to step 426.

At step 448, the readiness engine determines an engagement score based on the eye gaze score and/or the distraction score. Depending on the scales, a participant with a very active video and audio background may have an eye gaze score of 10 (lot of eye motion) and the distraction score of 10 (lot of distracting activity), so the determined engagement score should be normalized as low, e.g., 0 on a scale of 1 to 10, to indicate a lack of readiness for the participant. In some embodiments, an engagement score may be the average of the two eye gaze score and the distraction score, subtracted from 10. For example, an eye gaze score of 3.1 and the distraction score of 5.9 may produce an engagement score of 5.5 out of 10. Such an engagement score may indicate that there is a fair amount of background issues. In some cases, if either the audio or video is muted, the engagement score may indicate a lack of readiness with a low score. An engagement score may be calculated in many ways, including as a weighted average eye gaze score and/or activity score.

Figures 4C, 4D, 4E:
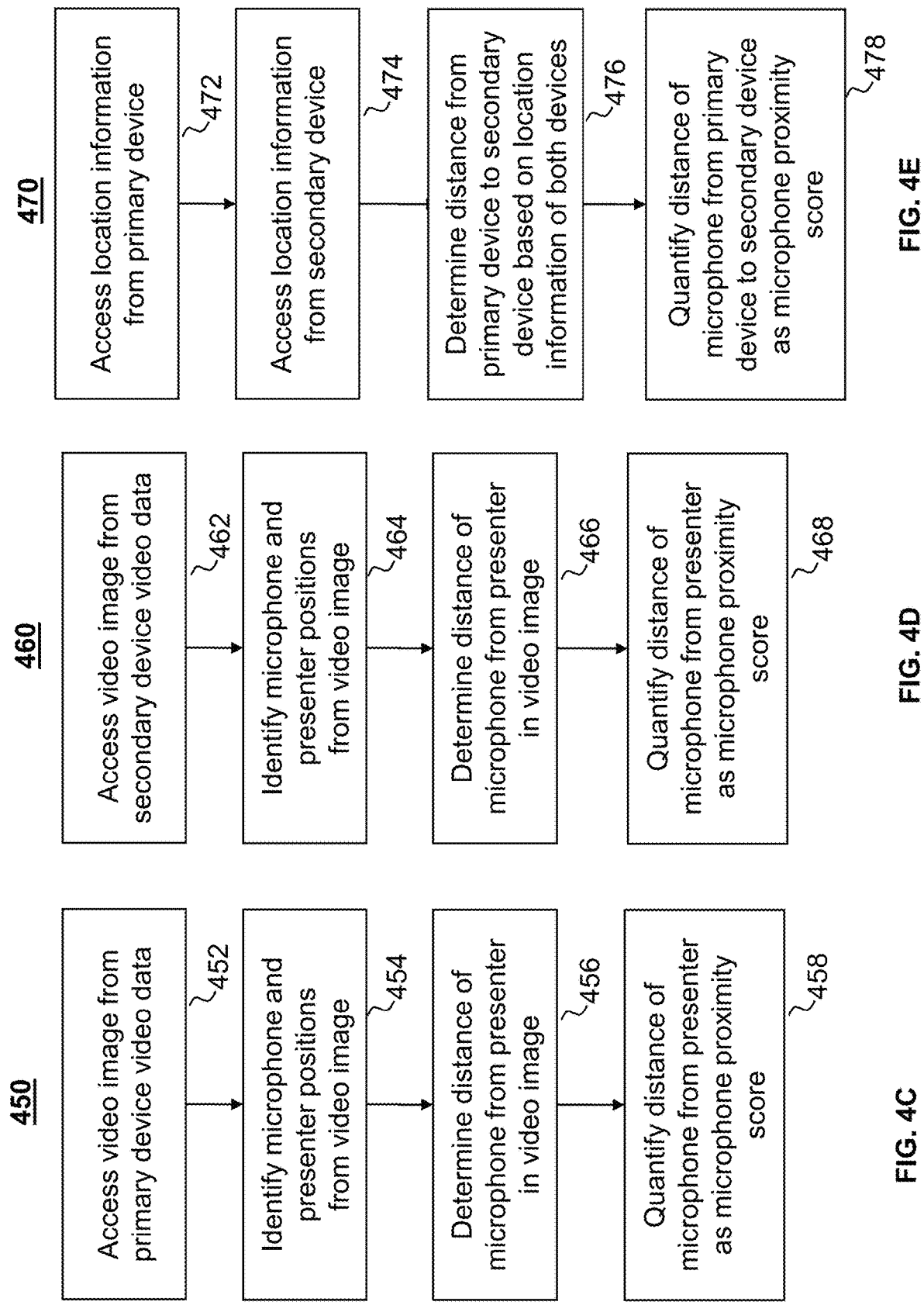
FIG. 4C depicts an illustrative flowchart of a process for determining a microphone proximity score of a meeting participant, in accordance with some embodiments of the disclosure.
FIG. 4D depicts an illustrative flowchart of a process for determining a microphone proximity score of a meeting participant, in accordance with some embodiments of the disclosure.
FIG. 4E depicts an illustrative flowchart of a process for determining a microphone proximity score of a meeting participant, in accordance with some embodiments of the disclosure.

FIG. 4C depicts an illustrative flowchart of a process for determining a microphone proximity score of a meeting participant, in accordance with some embodiments of the disclosure. There are many ways to determine a microphone proximity score for a participant, and Process 450 of FIG. 4C is an exemplary process to determine a microphone proximity score based on video data, e.g., from a primary device. Some embodiments may utilize a readiness engine to perform one or more parts of Process 450, e.g., as part of a video conference or virtual meeting application, stored and executed by one or more of the processors and memory of a device and/or server such as those depicted in FIGS. 6 and 7. In Process 450 a primary device may be a device with which a participant is connecting to the virtual meeting. In some embodiments, a primary device may be a computer, laptop, smart television, tablet, or smart phone.

At step 452, the readiness engine accesses video image from primary device video data. For instance, the readiness engine may access the video feed from a camera connected to the participant's device connected to the meeting. The readiness engine may access video data for each attendee's device, e.g., as it is transmitted or buffered through a platform server. In some embodiments, the device may combine audio and video data as a multimedia data stream, accessible by the readiness engine. In some embodiments, the device may separate video data from a multimedia data stream for analysis. In some cases, a participant may mute her video, which may indicate a low level of readiness. Still, in some instances, a readiness engine may access the captured video stream from the device while it is muted or prior to muting.

At step 454, the readiness engine identifies the microphone and presenter positions from video image. For example, the readiness engine may use image recognition tools to identify features in a video image that are (i) a microphone and (ii) a presenter (e.g., the participant). In some embodiments, the readiness engine may know the position of the microphone. For instance, the microphone may be on the device, which may have relayed the microphone location information, or it may be accessible from a hardware profile database. In some embodiments, the readiness engine may assume the microphone is near or adjacent to the camera as a default. The default may be changed if a microphone is observed or the hardware profile changes. The participant, as a presenter, should be visible in the video image, and a distance from the camera should be determined based on known camera specifications and trigonometry. If the participant is not visible, the presenter may have stepped away, and is clearly not ready to present next. Likewise, if the microphone leaves view as it is attached to the participant (or the participant's headphones), the microphone proximity score should be zero and the participant is likely not ready to present. In some embodiments, distances and resultant microphone proximity scores may be updated dynamically, every few seconds or minutes.

At step 456, the readiness engine determines distance of the microphone from the presenter in video image. For example, if the positions of (i) a microphone and (ii) a presenter are known, the distance between the microphone and the presenter may be determined based on known camera specifications and trigonometry.

At step 458, the readiness engine quantifies distance of microphone from presenter as microphone proximity score. A lower microphone proximity score should indicate a greater distance. A scale of five feet to zero feet may be scored on a scale of 0-10, with any distance over five feet receiving a microphone proximity score of zero. For instance, a measurement of 0.5 feet may earn a 9.0 out of 10 microphone proximity score. In some embodiments, microphone proximity score may be scaled based on the quality of the microphone. For instance, being five feet away from a very high-quality microphone may merit a higher microphone proximity score than being two feet from a medium- or low-quality microphone.

FIG. 4D depicts an illustrative flowchart of a process for determining a microphone proximity score of a meeting participant, in accordance with some embodiments of the disclosure. There are many ways to determine a microphone proximity score for a participant, and Process 460 of FIG. 4D is an exemplary process to determine a microphone proximity score based on video data, e.g., from a secondary device. Some embodiments may utilize a readiness engine to perform one or more parts of Process 460, e.g., as part of a video conference or virtual meeting application, stored and executed by one or more of the processors and memory of a device and/or server such as those depicted in FIGS. 6 and 7. In Process 460 a secondary device may be any device used simultaneously with, but different from, the primary device used by a participant to connect to the virtual meeting. For instance, in Process 460 a primary device may be a laptop and the secondary device may be a smart phone. In some implementations of Process 460, for example, a secondary device may be a smart phone, tablet, laptop, computer, smart television, smart watch, or network-connected camera, while a primary device may be a computer, laptop, smart television, tablet, or smart phone.

At step 462, the readiness engine accesses video image from secondary device video data. For instance, the readiness engine may access the video feed from a camera connected to the participant's secondary device rather than the device connected to the meeting. The readiness engine may access video data for each attendee's secondary device constantly or as needed. In some embodiments, the device may combine audio and video data as a multimedia data stream, accessible by the readiness engine. In some embodiments, the device may separate video data from a multimedia data stream for analysis. In some cases, a readiness engine may access a captured video stream from a secondary device while it is muted or prior to muting.

At step 464, the readiness engine identifies the microphone and presenter positions from video image. For example, the readiness engine may use image recognition tools to identify features in a video image that are (i) a microphone and (ii) a presenter (e.g., the participant). In some embodiments, the readiness engine may know the position of the microphone. In some embodiments, the readiness engine may assume the microphone is near or adjacent to the camera connected to the primary device as a default. The default may be changed if a microphone is observed in the secondary video image data or the hardware profile changes. The participant, as a presenter, may be visible in the video image, and a distance from the camera should be determined based on known camera specifications and trigonometry. In some embodiments, distances and resultant microphone proximity scores may be updated dynamically.

At step 466, the readiness engine determines distance of the microphone from the presenter in video image. For example, if the positions of (i) a microphone and (ii) a presenter are known, the distance between the microphone and the presenter may be determined based on known camera specifications and trigonometry.

At step 458, the readiness engine quantifies distance of microphone from presenter as microphone proximity score. A lower microphone proximity score should indicate a greater distance. A scale of ten feet to zero feet may be scored on a scale of 0-10, with any distance over ten feet receiving a microphone proximity score of zero. For instance, a measurement of 4.2 feet may earn a 5.8 out of 10 microphone proximity score.

FIG. 4E depicts an illustrative flowchart of a process for determining a microphone proximity score of a meeting participant, in accordance with some embodiments of the disclosure. There are many ways to determine a microphone proximity score for a participant, and Process 470 of FIG. 4E is an exemplary process to determine a microphone proximity score based on location data of a primary device and a secondary device. Some embodiments may utilize a readiness engine to perform one or more parts of Process 450, e.g., as part of a video conference or virtual meeting application, stored and executed by one or more of the processors and memory of a device and/or server such as those depicted in FIGS. 6 and 7. In Process 470 a secondary device may be any device used simultaneously with, but different from, the primary device used by a participant to connect to the virtual meeting. For instance, in Process 470 a primary device may be a laptop and the secondary device may be Bluetooth-connected headphones (with a microphone). In some cases, Process 470 may feature a desktop PC as a primary device and the secondary device may be a wirelessly connected smart watch. In some implementations of Process 470, for example, a secondary device may be a smart phone, tablet, laptop, headphones, microphone, computer, smart television, smart watch, or network-connected camera, while a primary device may be a computer, laptop, smart television, tablet, or smart phone. Approximating the distance of a microphone on the primary device to the participant may be more accurate if the participant is carrying (or otherwise near) the secondary device, such as cases with a watch on a participant's wrist or smart phone in a participant's pocket.

At step 472, a readiness engine accesses location information from a primary device. The readiness engine may access location information from a primary device from location-based services based in GPS, Wi-Fi, Bluetooth, and other technologies. For instance, Bluetooth connection may allow the primary device to define its location based on one or more secondary devices in the area. GPS may provide precise coordinates for the primary device.

At step 474, the readiness engine access location information from secondary device. Similarly, the readiness engine may access location information from a secondary device from location-based services based in GPS, Wi-Fi, Bluetooth, and other technologies. In some cases, the primary device may have location device based on a wireless (or wired) connection. For instance, Bluetooth connection may generate coordinates (or a distance) for the secondary device based on a connection to the primary device. Likewise, GPS may provide precise coordinates for the secondary device.

At step 476, the readiness engine determines distance from primary device to secondary device based on location information of both devices. For example, if the positions of (i) the primary device and (ii) the secondary device are known, the distance between the microphone and the presenter may be determined based on the coordinates and trigonometry. In some embodiments, the distance may be computed between the two devices based on a strength of signal in a wireless (or wired) connection.

At step 478, the readiness engine quantifies distance of primary device and secondary device as a microphone proximity score. A lower microphone proximity score should indicate a greater distance. A scale of ten feet to zero feet may be scored on a scale of 0-10, with any distance over ten feet receiving a microphone proximity score of zero. For instance, a measurement of 5.9 feet may earn a 4.1 out of 10 microphone proximity score.

Figure 5:
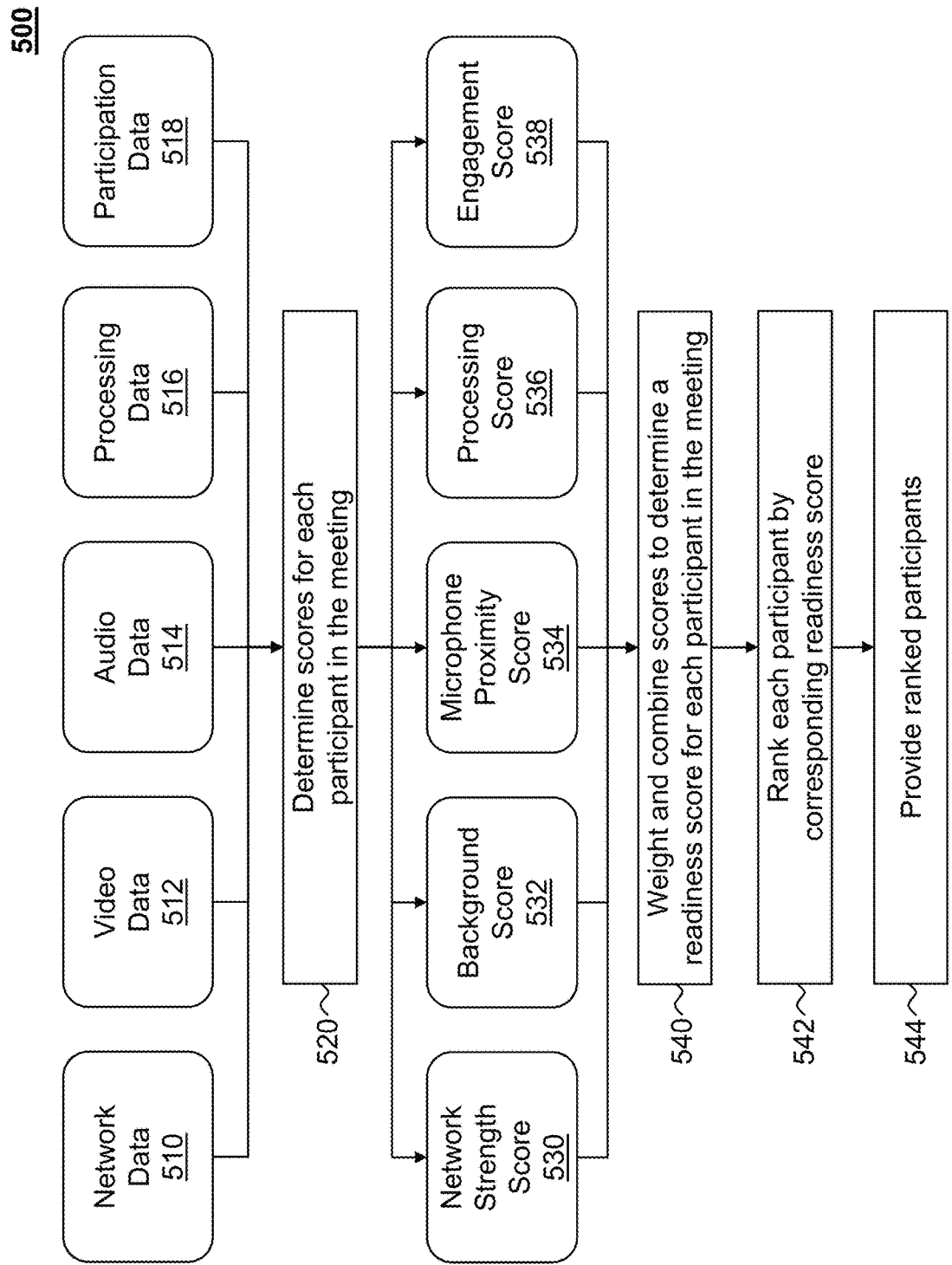
FIG. 5 depicts an illustrative flow diagram of a process for determining readiness scores of meeting participants; in accordance with some embodiments of the disclosure.

FIG. 5 depicts an illustrative flow diagram of a process for determining readiness scores of meeting participants. in accordance with some embodiments of the disclosure. There are many ways to determine a readiness scores for a participant, and Process 500 of FIG. 5 is an exemplary process to determine a readiness score. Some embodiments may utilize a readiness engine to perform one or more parts of Process 500, e.g., as part of a video conference or virtual meeting application, stored and executed by one or more of the processors and memory of a device and/or server such as those depicted in FIGS. 6 and 7.

Initially, the readiness engine accesses Network Data 510, Video Data 512, Audio Data 514, Processing Data 516, and Participation Data 518. In some embodiments, data 510-518 may be accessed at a participant's primary device, a participant's secondary device(s), a central server, a participant profile, or a database.

The readiness engine may use Network Data 510, Video Data 512, Audio Data 514, Processing Data 516, and Participation Data 518, and other available data, to determine scores for each participant in the meeting, at step 520. The readiness engine determines Network Strength Score 530, Background Score 532, Microphone Proximity Score 534, Processing Score 536, and Engagement Score 538.

To determine Network Strength Score 530, the readiness engine may determine network strength in many ways based on, at least, Network Data 510. Each participant device may report its current download and upload speeds, as well as Quality of Service (QoS) as part of Network Data 510. A readiness engine may monitor the network data of each participant during the meeting to determine a network strength score. Network Strength Score 530 may be calculated as download speed, upload speed, QoS, latency or other measure of network reliability and normalized, e.g., on a scale of 1-10, based on meeting participants in the current meeting or logged into the platform.

To determine Background Score 532, the readiness engine may determine network strength in many ways based on, at least, Network Data 510. In some embodiments, the readiness engine may use a process like Process 410 depicted in FIG. 4A.

To determine Microphone Proximity Score 534, the readiness engine may determine network strength in many ways based on, at least, Video Data 512. In some embodiments, the readiness engine may use a process like one or more of Process 450 depicted in FIG. 4C, Process 460 depicted in FIG. 4D, or Process 470 depicted in FIG. 4E to determine Microphone Proximity Score 534.

To determine Processing Score 536, the readiness engine may determine processing capacity in many ways based on, at least, Processing Data 516. Processing power availability may be crucial for a speaker who is about to present. Processing Data 516 may indicate if a device is running many other parallel processes, and that the CPU may be struggling to support the user to speak or share video during the call. Processing power, and availability of CPU, may be readily determined by the readiness engine through system monitoring and relaying of measurements and processing data 516.

To determine Engagement Score 538, the readiness engine may determine network strength in many ways based on, at least, Participation Data 518. In some embodiments, the readiness engine may use a process like Process 430 depicted in FIG. 4B to determine Engagement Score 538.

At step 540, the readiness engine will weight and combine scores to determine a readiness score for each participant in the meeting. In some embodiments, the readiness engine may use a table like Table 101 depicted in FIG. 1B to access weights and determine readiness scores such as those identified under readiness score 190.

At step 542, the readiness engine will rank each participant by the corresponding readiness score. In some embodiments, the readiness engine may use a table like Table 101 depicted in FIG. 1B to rank readiness scores as depicted under rank 192.

At step 544, the readiness engine will provide the ranked meeting participants. In some embodiments, the readiness engine may use a user interface like user interface 110 in Scenario 100 of FIG. 1A, user interface 210 in Scenario 200 of FIG. 2, and/or user interface 310 in Scenario 300 of FIG. 3 to rank provide the ranked meeting participants.

FIG. 6 is a diagram of an illustrative device, in accordance with some embodiments of the disclosure. Device 600 may be implemented by a device or system, e.g., a device providing a display to a user, or any other suitable control circuitry configured to generate a display to a user of content. For example, device 600 of FIG. 6 can be implemented as equipment 601. In some embodiments, equipment 601 may include set-top box 616 that includes, or is communicatively coupled to, display 612, audio equipment 614 (e.g., speakers or headphones), microphone 616, camera 618, and user input interface 610. In some embodiments, display 612 may include a television display or a computer display. In some embodiments, user interface input 610 is a remote-control device. Set-top box 616 may include one or more circuit boards. In some embodiments, the one or more circuit boards include processing circuitry, control circuitry, and storage (e.g., RAM, ROM, Hard Disk, Removable Disk, etc.). In some embodiments, circuit boards include an input/output path.

Each one of device 600 and equipment 601 may receive content and receive data via input/output (hereinafter "I/O") path 602. I/O path 602 may provide content and receive data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communication paths (described below). I/O functions may be provided by one or more of these communication paths but are shown as a single path in FIG. 6 to avoid overcomplicating the drawing. While set-top box 616 is shown in FIG. 6 for illustration, any suitable computing device having processing circuitry, control circuitry, and storage may be used in accordance with the present disclosure. For example, set-top box 616 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for an application readiness engine stored in memory (e.g., storage 608). Specifically, control circuitry 604 may be instructed by the application to perform the functions discussed above and below. For example, the application may provide instructions to control circuitry 604 to generate the content guidance displays. In some implementations, any action performed by control circuitry 604 may be based on instructions received from the application.

In some client/server-based embodiments, control circuitry 604 includes communications circuitry suitable for communicating with an application server. A readiness engine may be a stand-alone application implemented on a device or a server. A readiness engine may be implemented as software or a set of executable instructions. The instructions for performing any of the embodiments discussed herein of the readiness engine may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 6, the instructions may be stored in storage 608, and executed by control circuitry 604 of a device 600.

In some embodiments, a readiness engine may be a client/server application where only the client application resides on device 600 (e.g., devices 702A-F), and a server application resides on an external server (e.g., server 706). For example, a readiness engine may be implemented partially as a client application on control circuitry 604 of device 600 and partially on server 706 as a server application running on control circuitry. Server 706 may be a part of a local area network with one or more of devices 702A-F or may be part of a cloud computing environment accessed via the internet. In a cloud computing environment, various types of computing services for performing searches on the internet or informational databases, providing storage (e.g., for a database or scoring table) or parsing data are provided by a collection of network-accessible computing and storage resources (e.g., server 706), referred to as "the cloud." Device 600 may be a cloud client that relies on the cloud computing capabilities from server 706 to access profiles, enhance content items, and provide content by the readiness engine. When executed by control circuitry of server 706, the readiness engine may instruct the control circuitry to generate the readiness engine output (e.g., content items and/or indicators) and transmit the generated output to one or more of devices 702A-F. The client application may instruct control circuitry of the receiving device 702A-F to generate the readiness engine output. Alternatively, one or more of devices 702A-F may perform all computations locally via control circuitry 604 without relying on server 706.

Control circuitry 604 may include communications circuitry suitable for communicating with a readiness engine server, a table or database server, or other networks or servers. The instructions for carrying out the above-mentioned functionality may be stored and executed on the application server 706. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the internet or any other suitable communication network or paths. In addition, communications circuitry may include circuitry that enables peer-to-peer communication of devices, or communication of devices in locations remote from each other.

Memory may be an electronic storage device such as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 608 may be used to store various types of content described herein as well as content guidance data described above. Nonvolatile memory may also be used (e.g., to launch a boot-up routine and other instructions). Cloud-based storage, for example, (e.g., on server 706) may be used to supplement storage 608 or instead of storage 608.

A user may send instructions to control circuitry 604 using user input interface 610. User input interface 610, display 612 may be any suitable interface such as a touchscreen, touchpad, or stylus and/or may be responsive to external device add-ons, such as a remote control, mouse, trackball, keypad, keyboard, joystick, voice recognition interface, or other user input interfaces. Display 610 may include a touchscreen configured to provide a display and receive haptic input. For example, the touchscreen may be configured to receive haptic input from a finger, a stylus, or both. In some embodiments, equipment device 600 may include a front-facing screen and a rear-facing screen, multiple front screens, or multiple angled screens. In some embodiments, user input interface 610 includes a remote-control device having one or more microphones, buttons, keypads, any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 616.

Audio equipment 610 may be integrated with or combined with display 612. Display 612 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Audio equipment 614 may be provided as integrated with other elements of each one of device 600 and equipment 601 or may be stand-alone units. An audio component of videos and other content displayed on display 612 may be played through speakers (or headphones) of audio equipment 614. In some embodiments, audio may be distributed to a receiver (not shown), which processes and outputs the audio via speakers of audio equipment 614. In some embodiments, for example, control circuitry 604 is configured to provide audio cues to a user, or other audio feedback to a user, using speakers of audio equipment 614. There may be a separate microphone 616 or audio equipment 614 may include a microphone configured to receive audio input such as voice commands or speech. For example, a user may speak letters or words that are received by the microphone and converted to text by control circuitry 604. In a further example, a user may voice commands that are received by a microphone and recognized by control circuitry 604. Camera 618 may be any suitable video camera integrated with the equipment or externally connected. Camera 618 may be a digital camera comprising a charge-coupled device (CCD) and/or a complementary metal-oxide semiconductor (CMOS) image sensor. Camera 618 may be an analog camera that converts to digital images via a video card.

An application (e.g., for generating a display) may be implemented using any suitable architecture. For example, a stand-alone application may be wholly implemented on each one of device 600 and equipment 601. In some such embodiments, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 604 may allow a user to provide user profile information or may automatically compile user profile information. For example, control circuitry 604 may access and monitor network data, video data, audio data, processing data, participation data from a participant profile. In some embodiments, control circuitry 604 may calculate several scores, such as a readiness score, based on profile data. Control circuitry 604 may store scores in a database and the database may be linked to a user profile. Additionally, control circuitry 604 may obtain all or part of other user profiles that are related to a particular user (e.g., via social media networks), and/or obtain information about the user from other sources that control circuitry 604 may access. As a result, a user can be provided with a unified experience across the user's different devices.

In some embodiments, the application is a client/server-based application. Data for use by a thick or thin client implemented on each one of device 600 and equipment 601 is retrieved on-demand by issuing requests to a server remote from each one of device 600 and equipment 601. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on device 600. This way, the processing of the instructions is performed remotely by the server while the resulting displays (e.g., that may include text, a keyboard, or other visuals) are provided locally on device 600. Device 600 may receive inputs from the user via input interface 610 and transmit those inputs to the remote server for processing and generating the corresponding displays. For example, device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to device 600 for presentation to the user.

As depicted in FIG. 7, one or more of devices 702A-F may be coupled to communication network 704. Communication network 704 may be one or more networks including the internet, a mobile phone network, mobile voice or data network (e.g., a 5G or 4G or LTE network), cable network, public switched telephone network, Bluetooth, or other types of communication network or combinations of communication networks. Thus, devices 702A-F may communicate with server 706 over communication network 704 via communications circuitry described above. In should be noted that there may be more than one server 706, but only one is shown in FIG. 7 to avoid overcomplicating the drawing. The arrows connecting the respective device(s) and server(s) represent communication paths, which may include a satellite path, a fiber-optic path, a cable path, a path that supports internet communications (e.g., IPTV), free-space connections (e.g., for broadcast or other wireless signals), or any other suitable wired or wireless communications path or combination of such paths.

In some embodiments, the application is downloaded and interpreted or otherwise run by an interpreter or virtual machine (e.g., run by control circuitry 604). In some embodiments, the application may be encoded in the ETV Binary Interchange Format (EBIF), received by control circuitry 604 as part of a suitable feed, and interpreted by a user agent running on control circuitry 604. For example, the application may be an EBIF application. In some embodiments, the application may be defined by a series of JAVA-based files that are received and run by a local virtual machine or other suitable middleware executed by control circuitry 604.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of prioritizing participants in a virtual meeting via a network, the method comprising:
    accessing, for each of a plurality of participants, criteria data comprising network data, video data, audio data, processing data, and participation data;
    determining, for each of the plurality of participants, at least one criteria score based on the criteria data, the at least one criteria score selected from the group of a signal strength score, a background score, a microphone proximity score, a processing score, and an engagement score;
    calculating a readiness score, for each of the plurality of participants, based on the at least one criteria score;
    ranking the plurality of participants based on the corresponding readiness score; and
    providing the ranked plurality of participants.

2. The method of claim 1, wherein providing the ranked plurality of participants further comprises providing a user interface displaying the ranked plurality of participants.

3. The method of claim 1 further comprising providing an indication of one of the plurality of participants ranked highest as a next presenter.

4. The method of claim 1, wherein calculating the readiness score comprises calculating a weighted average based on at least two criteria scores selected from the group of signal strength score, background score, microphone proximity score, processing score, and engagement score.

5. The method of claim 1, wherein determining the signal strength score further comprises analyzing network data to determine at least one of bandwidth or Quality of Service.

6. The method of claim 1, wherein determining the background score further comprises at least one of analyzing the corresponding video data for background image activity or analyzing the corresponding audio data for background audio noise.

7. The method of claim 1, wherein determining the microphone proximity score further comprises analyzing the corresponding video data to determine a distance between the respective one of the plurality of participants and a corresponding microphone.

8. The method of claim 1, wherein determining the microphone proximity score further comprises:
    determining the video data does not include a microphone;

accessing position information of a first device and a second device;

determining the distance between the first device and the second device; and updating the microphone proximity score based on the determined distance.

9. The method of claim 1, wherein determining the processing score further comprises analyzing processing data to determine at least one of processor speed or processor tasks.

10. The method of claim 1, wherein determining the engagement score further comprises at least one of analyzing the corresponding video data for eye gaze activity or analyzing the participation data for distracting activity.

11. A system for prioritizing participants in a virtual meeting via a network, the system comprising:

first input/output circuitry configured to access, for each of a plurality of participants, criteria data comprising network data, video data, audio data, processing data, and participation data;

processing circuitry configured to:

determine, for each of the plurality of participants, at least one criteria score based on the criteria data, the at least one criteria score selected from the group of a signal strength score, a background score, a microphone proximity score, a processing score, and an engagement score;

calculate a readiness score, for each of the plurality of participants, based on the at least one criteria score;

rank the plurality of participants based on the corresponding readiness score; and second input/output circuitry configured to providing the ranked plurality of participants.

12. The system of claim 11, wherein the processing circuitry is further configured to provide the ranked plurality of participants by providing a user interface displaying the ranked plurality of participants.

13. The system of claim 11, wherein the processing circuitry is further configured to provide an indication of one of the plurality of participants ranked highest as a next presenter.

14. The system of claim 11, wherein the processing circuitry is further configured to calculate the readiness score by calculating a weighted average based on at least two criteria scores selected from the group of signal strength score, background score, microphone proximity score, processing score, and engagement score.

15. The system of claim 11, wherein the processing circuitry is further configured to determine the signal strength score by analyzing network data to determine at least one of bandwidth or Quality of Service.

16. The system of claim 11, wherein the processing circuitry is further configured to determine the background score by analyzing the corresponding video data for background image activity or analyzing the corresponding audio data for background audio noise.

17. The system of claim 11, wherein the processing circuitry is further configured to determine the microphone proximity score by analyzing the corresponding video data to determine a distance between the respective one of the plurality of participants and a corresponding microphone.

18. The system of claim 11, wherein the processing circuitry is further configured to determine the microphone proximity score by:

determining the video data does not include a microphone;

accessing position information of a first device and a second device;

determining the distance between the first device and the second device; and updating the microphone proximity score based on the determined distance.

19. The system of claim 11, wherein the processing circuitry is further configured to determine the processing score by analyzing processing data to determine at least one of processor speed or processor tasks.

20. The system of claim 11, wherein the processing circuitry is further configured to determine the engagement score by analyzing the corresponding video data for eye gaze activity or analyzing the participation data for distracting activity.

* * * * *